United States Patent
Arhab et al.

(10) Patent No.: US 6,675,941 B1
(45) Date of Patent: Jan. 13, 2004

(54) HYDROKINETIC COUPLING DEVICE COMPRISING AN IMPROVED REACTOR OVERRUNNING CLUTCH

(75) Inventors: Rabah Arhab, Saint Brice Sous Foret (FR); Daniel Satonnet, Amiens (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 10/088,214

(22) PCT Filed: Sep. 29, 2000

(86) PCT No.: PCT/FR00/02719

§ 371 (c)(1),
(2), (4) Date: Mar. 15, 2002

(87) PCT Pub. No.: WO01/23778

PCT Pub. Date: Apr. 5, 2001

(30) Foreign Application Priority Data

Sep. 29, 1999 (FR) .............................. 99 12175

(51) Int. Cl.[7] .......................... F16H 41/24; F16D 33/18
(52) U.S. Cl. ...................... 192/3.21; 192/3.29; 192/45.1
(58) Field of Search ............................... 192/3.21, 3.29, 192/3.34, 41 R, 45, 45.1; 60/345

(56) References Cited

U.S. PATENT DOCUMENTS

| | | |
|---|---|---|
| 3,750,782 A | 8/1973 | Costantini et al. |
| 3,954,161 A | 5/1976 | Ehret et al. |
| 3,993,176 A | 11/1976 | Marola et al. |
| 4,809,831 A | 3/1989 | Kinoshita |
| 4,953,353 A * | 9/1990 | Lederman .................... 60/345 |
| 5,056,636 A | 10/1991 | Lederman |
| 5,515,956 A | 5/1996 | Schoder et al. |
| 5,806,644 A * | 9/1998 | Hinkel ....................... 192/45.1 |
| 6,044,946 A * | 4/2000 | Makino et al. ............... 192/45 |
| 6,202,810 B1 * | 3/2001 | Yamaguchi et al. ....... 192/3.29 |

FOREIGN PATENT DOCUMENTS

| | | | |
|---|---|---|---|
| EP | 0 549 824 A1 | 7/1993 | |
| EP | 0 611 898 A1 | 8/1994 | |
| EP | 0 731 285 A2 | 9/1996 | |
| EP | 0 743 467 A2 | 11/1996 | |
| FR | 2 720 131 A | 11/1995 | |
| GB | 1 419 236 A | 12/1975 | |
| GB | 2 190 440 A | 11/1987 | |
| JP | 61-294225 A * | 12/1986 | .......... F16D/41/06 |

* cited by examiner

*Primary Examiner*—Richard M. Lorence
(74) *Attorney, Agent, or Firm*—Liniak, Berenato & White

(57) ABSTRACT

A coupling device including a turbine and an impeller with an intervening reactor including a reactor body whereof the central part is linked in rotation with the output shaft via an overrunning clutch having an outer ring, intermediate locking elements, and at least a directly mounted lateral flange, generally shaped like a transversely oriented washer axially immobilized relative to the central part of the reactor body and extending radially inwards so as to co-operate, by its internal periphery, with a portion opposite the inner ring to link the reactor body in axial translation and guide it rotation with the inner ring. An element having a general rod-like shape is provided which axially passes, at least partly, through the outer ring of the overrunning clutch or the reactor body, or extends axially inside the overrunning clutch.

17 Claims, 22 Drawing Sheets

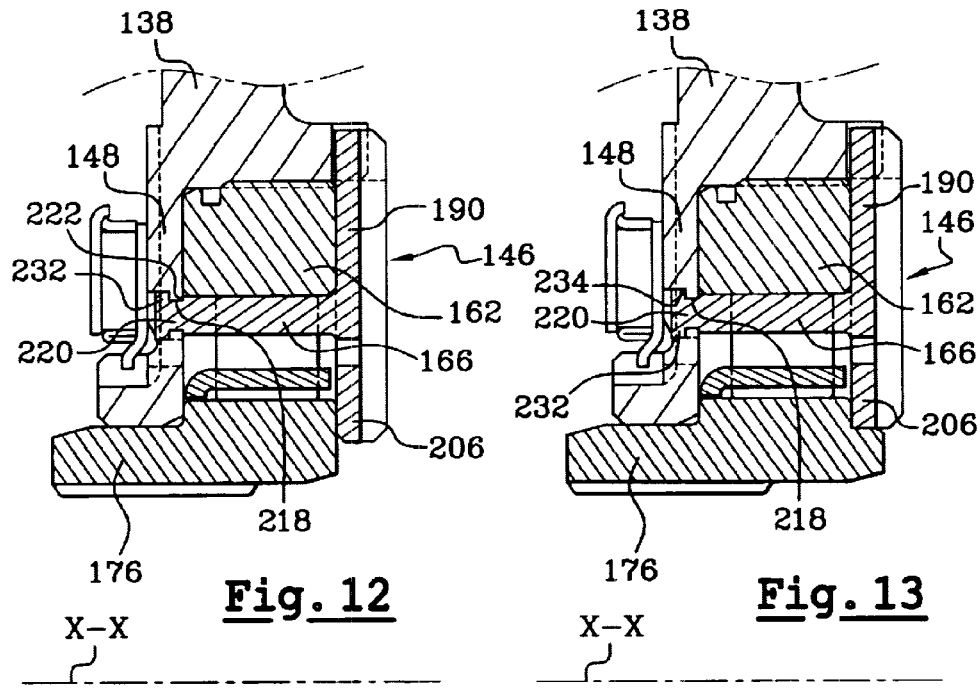
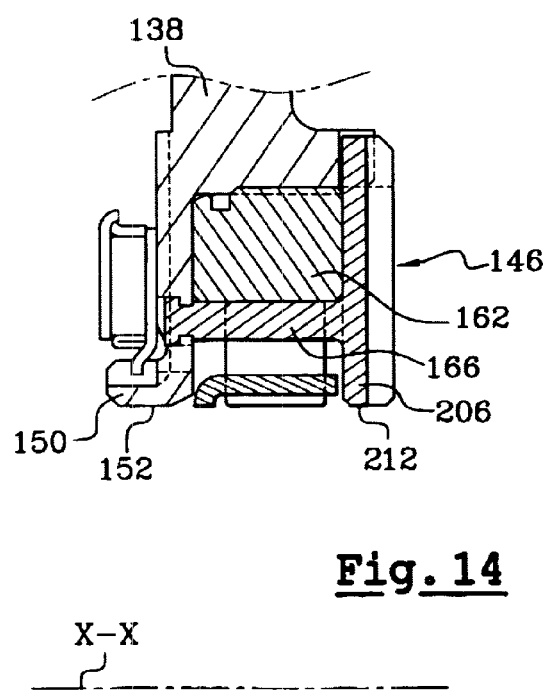

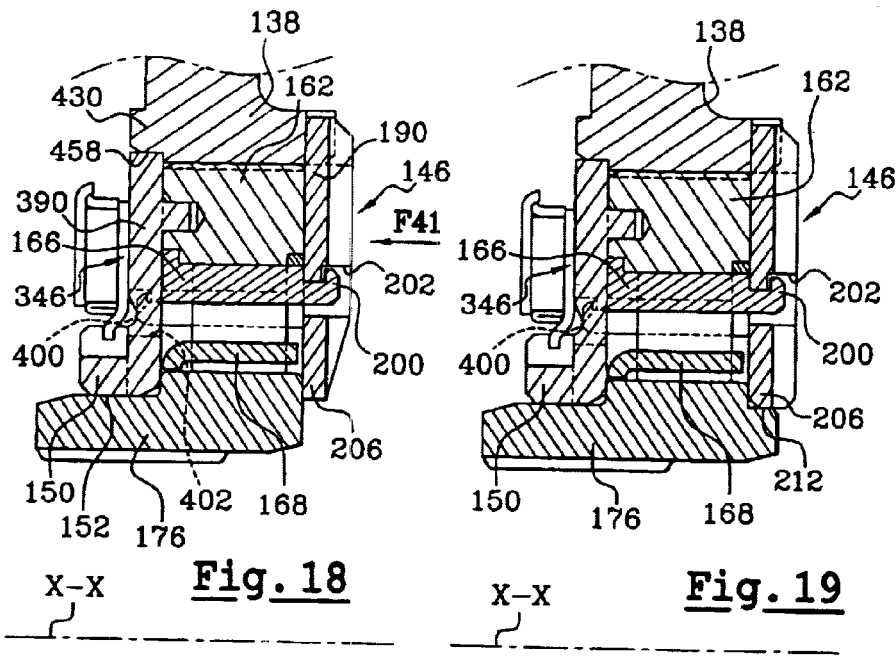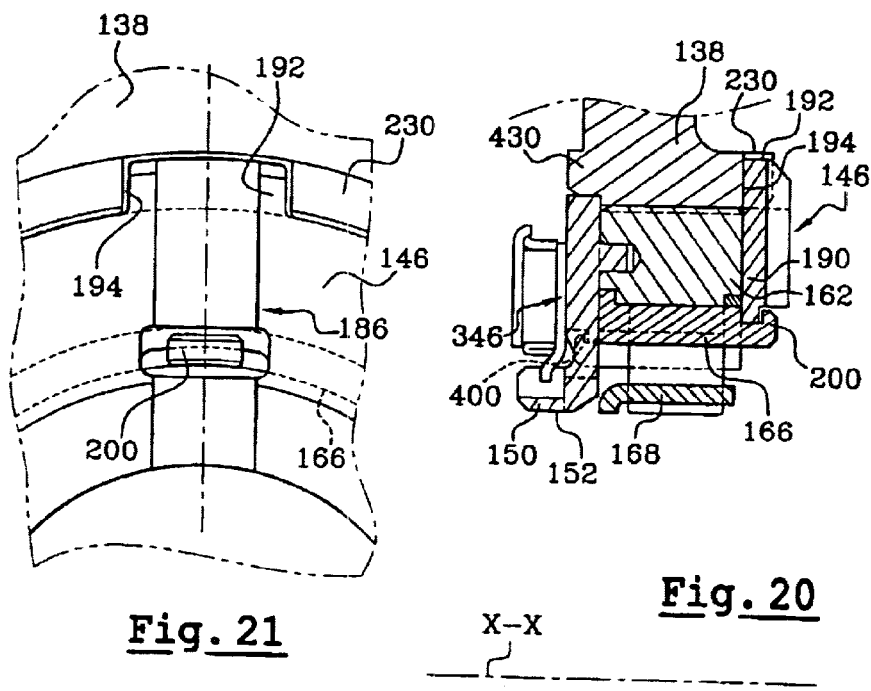

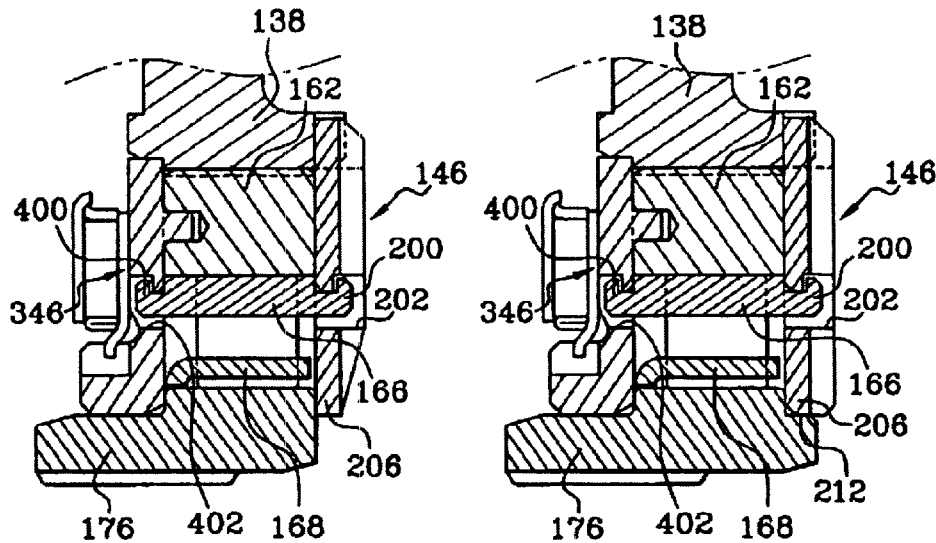
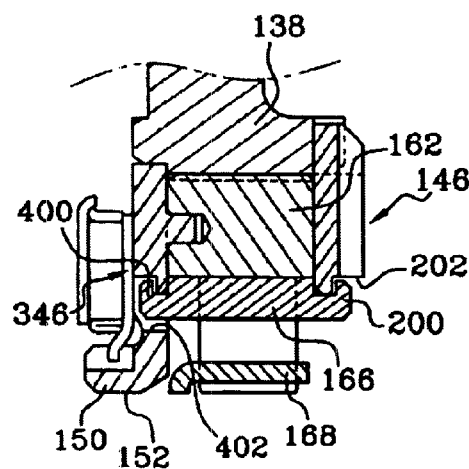

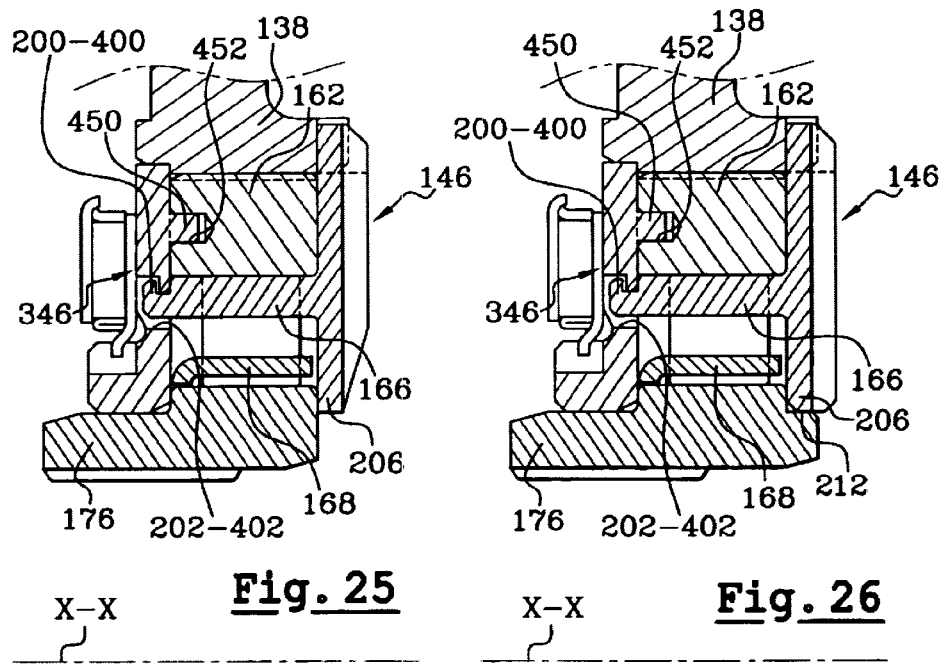
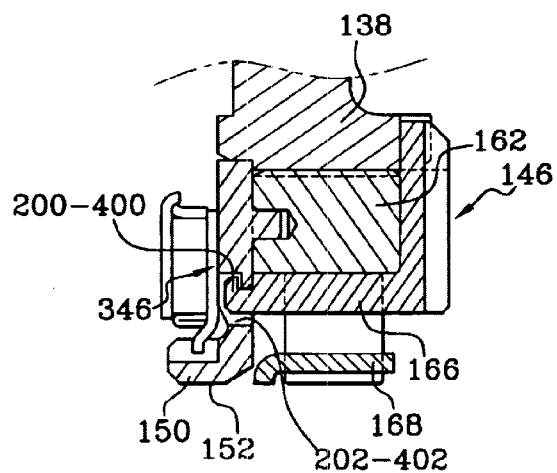

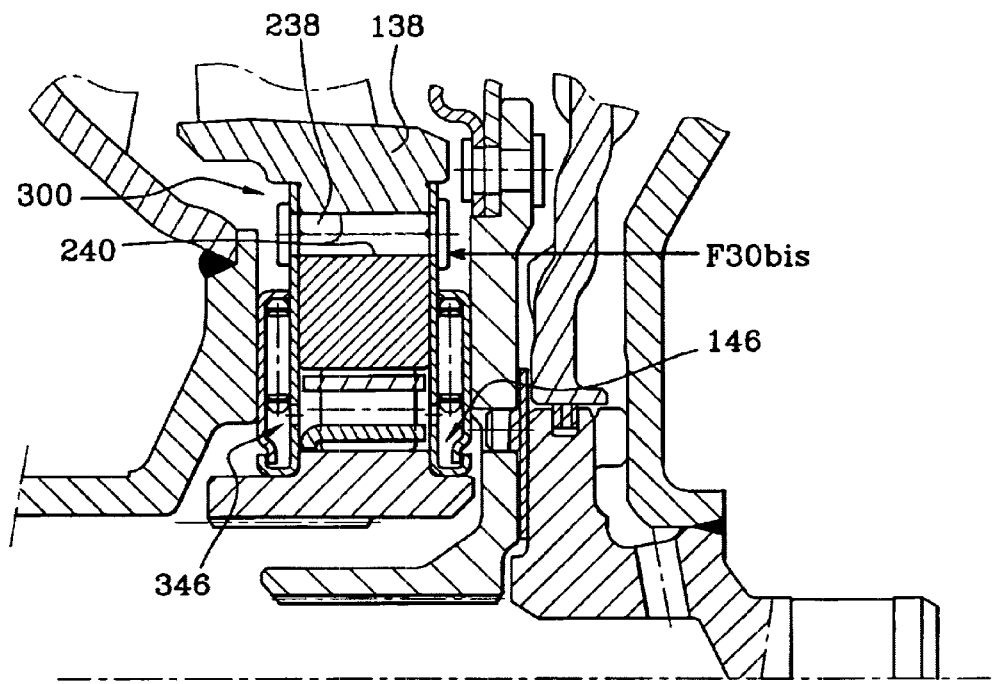
Fig. 30
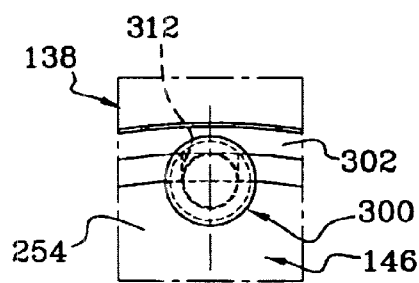
Fig. 30bis

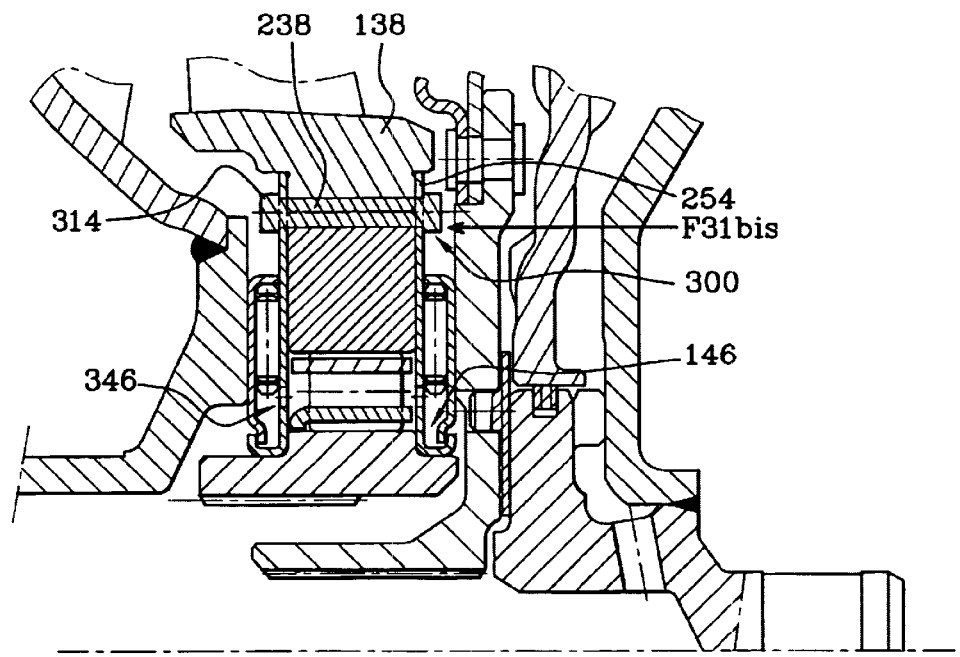
Fig. 31
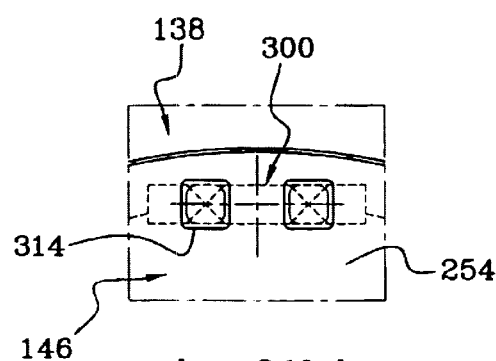
Fig. 31bis

HYDROKINETIC COUPLING DEVICE COMPRISING AN IMPROVED REACTOR OVERRUNNING CLUTCH

The present invention relates to a hydrokinetic coupling apparatus for a motor vehicle.

Such a hydrokinetic coupling apparatus is described, for example, in the document FR-A-2.738.891.

In this document, the apparatus includes an input element in the form of a casing equipped with a wall of overall transverse orientation, and an output element comprising a turbine-wheel fitment housed within the casing. The turbine wheel belongs to a hydrokinetic converter which consists of three elements fitted with vanes, with no mechanical link between them. The turbine wheel is integral with a hub linked in rotation to a receiving shaft, or driven shaft, which is itself linked to the input shaft of the gearbox of the vehicle, and it works together with an impeller wheel which is linked in rotation to the casing which is linked in rotation to the driving shaft driven by the combustion engine, a reactor being interposed axially between the turbine wheel and the impeller wheel, being mounted so as to rotate on the driven shaft with the interposition of a free wheel which allows rotation of the reactor in the engine direction, but prevents it in the opposite direction.

The invention thus relates, more particularly, to a hydrokinetic coupling apparatus, especially for a motor vehicle, including a casing suitable for being linked in rotation to a driving shaft, a front turbine wheel housed within the casing, integral with a hub, suitable for being linked in rotation to a driven shaft and which is driven, by virtue of the circulation of the fluid contained in the casing, by a rear impeller wheel, linked in rotation to the casing, with the intervention of a reactor, arranged axially between the front turbine wheel and rear impeller wheel, including a reactor body the central, radially inner, part of which is linked in rotation to the coaxial driven shaft which passes through it, with the interposition of a free wheel.

In a known way, the free wheel includes:

an outer ring linked in rotation to the central part of the reactor body;

intermediate blocking elements, which interact with an outer track of the outer ring and with an inner track of an inner ring of the free wheel which is linked in rotation to a fixed sleeve;

and at least one affixed lateral flange, in the general shape of a washer of transverse orientation, perpendicular to the axis of the free wheel, which is immobilised axially with respect to the central part of the reactor body and which extends radially inwards beyond the outer ring in order to retain the intermediate elements axially, in at least one direction.

In order to enhance the link between the inner ring of the free wheel and the reactor body, and especially in such a way as to provide a link in translation of the inner ring of the free wheel with respect to the reactor body and to enhance the rotational guidance of the free wheel with respect to the reactor body, a hydrokinetic coupling apparatus of the above-mentioned type has already been proposed, in which the said at least one lateral flange extends radially inwards in such a way as to interact, via its inner periphery, with a facing portion of the inner ring so as to link the reactor body in axial translation with the inner ring and/or to guide the reactor body in rotation with respect to the inner ring.

Such a design is described and represented in the document EP-A1-0.549.824, for example.

In order to reduce the number of components and to simplify their assembly, the invention proposes an apparatus of the above-mentioned type, characterised in that, for the axial retention of the flange, at least one, generally rod-shaped, element is provided, which passes axially, at least partly, through the outer ring of the free wheel or the body of the reactor, or which extends axially within the free wheel.

The invention proposes various embodiments which especially make it possible to reduce the number of machining operations to be carried out on the reactor body, to facilitate the fitting of the subassembly consisting of the reactor with its free wheel, to reduce the axial bulk of this subassembly, and more generally to simplify the design of the reactor by limiting the number of components in it and the number of types of components so as to produce a range of reactors while reducing the costs of manufacture and of assembly of this subassembly.

According to other characteristics of the invention:

the inner ring is traversed axially by the fixed sleeve, to which it is linked in rotation the inner ring consists of a portion of the fixed sleeve for one design according to the invention of a free wheel, called free wheel without inner ring;

the free wheel includes only a single lateral flange, and the central part of the reactor includes a lateral cheek of transverse orientation perpendicular to the axis of the free wheel, opposite the said single flange, which, with the latter, axially delimits a cavity in which are arranged the outer ring and the intermediate elements;

the free wheel includes another affixed lateral flange, in the general shape of a washer, of transverse orientation perpendicular to the axis of the free wheel, which is immobilised axially with respect to the central part of the reactor body, which extends radially inwards beyond the outer ring so as to retain the intermediate elements axially, in at least one direction, which is opposite the said at least one lateral flange, and which, with the latter, axially delimits a cavity in which are arranged the outer ring and the intermediate elements;

the said other lateral flange extends radially inwards so as to interact, via its inner periphery, with a facing portion of the inner ring so as to link the reactor body in axial translation with the inner ring and/or to guide the reactor body in rotation with respect to the inner ring;

the free wheel includes at least one outer cage which axially retains the intermediate elements, and the lateral flange is an element independent of the outer ring and of the outer cage;

the free wheel includes at least one outer cage which axially retains the intermediate elements, and the lateral flange is an element produced in a single piece with the outer cage;

the lateral flange is linked in rotation to the central part of the reactor;

the outer periphery of the lateral flange includes at least one rotational drive spigot which extends, especially radially outwards or axially, and which is received into a complementary cavity of the central part of the reactor which is open axially towards the flange;

the lateral flange is linked in rotation to the outer ring;

the lateral flange is retained axially with respect to the central part of the reactor body;

the lateral flange is retained axially by elastically deformable hooks received into complementary recesses;

the rod-shaped element is produced in the form of an independent component, especially a rivet;

the rivet-shaped element is produced in a single piece with an outer cage of the free wheel;

characterised in that the rivet-shaped element is produced in a single piece with a lateral flange;

the flange includes a transverse face which constitutes a bearing track for an axial, needle-type thrust bearing, interposed between the reactor and the turbine wheel, or between the reactor and the impeller wheel.

Other characteristics and advantages of the invention will become apparent on reading the detailed description which will follow, for an understanding of which reference will be made to the attached drawings, in which:

FIGS. 12 to 14 are views similar to those of FIGS. 9 to 11 which illustrate another design of the means for axial linking between the front lateral flange, integrating the outer cage, and the rear lateral cheek of the central part of the reactor body, which relies on the crimping of the outer cage;

Figure 3:
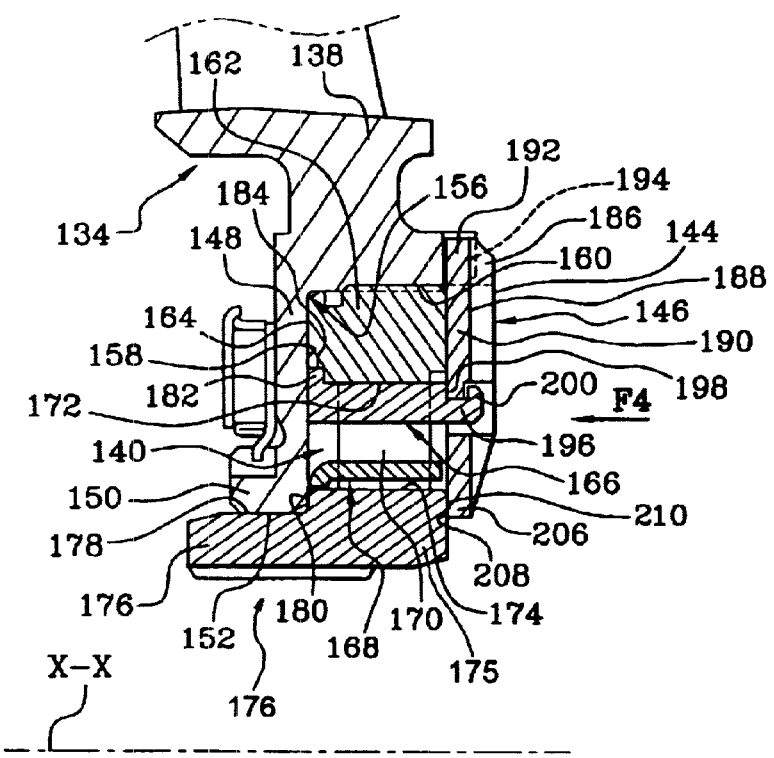
FIG. 3 is a detailed view on a larger scale of the central part of the reactor body and of the free wheel.
Figure 4:
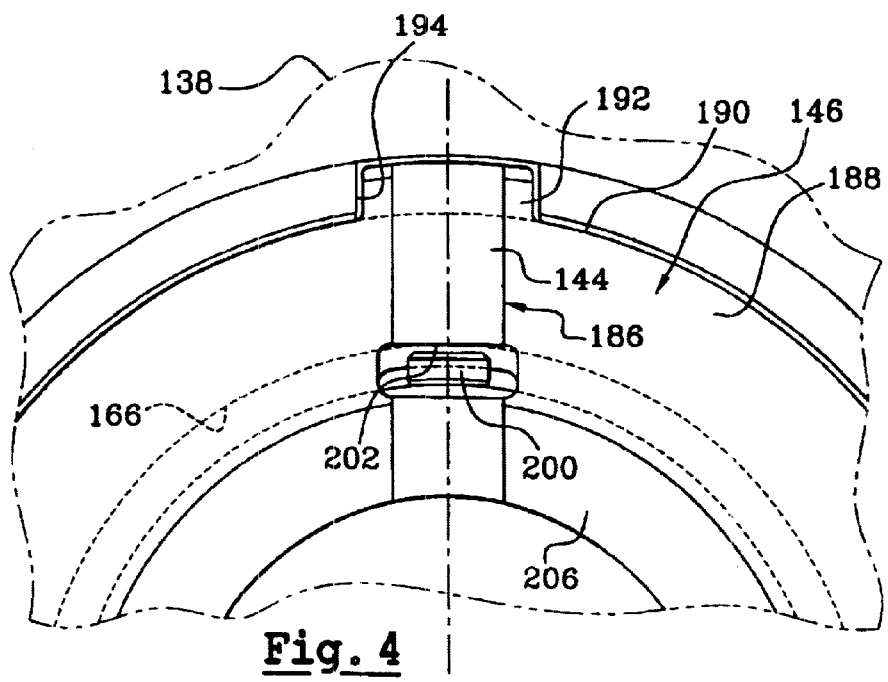
FIG. 4 is a detailed view along the arrow F4 of FIG. 3.
Figure 28:
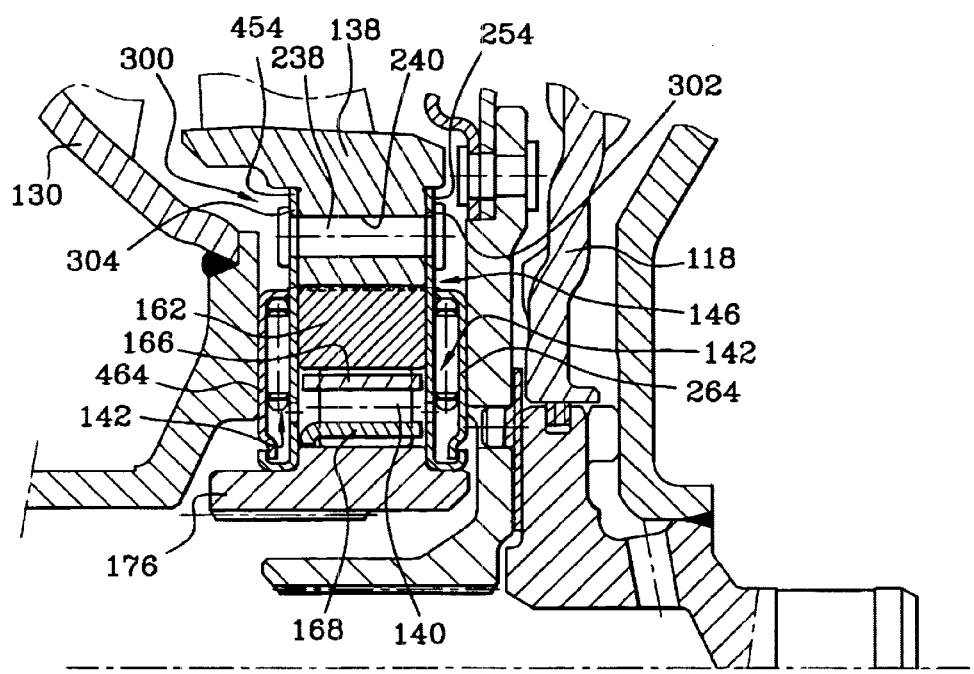
Figure 29:
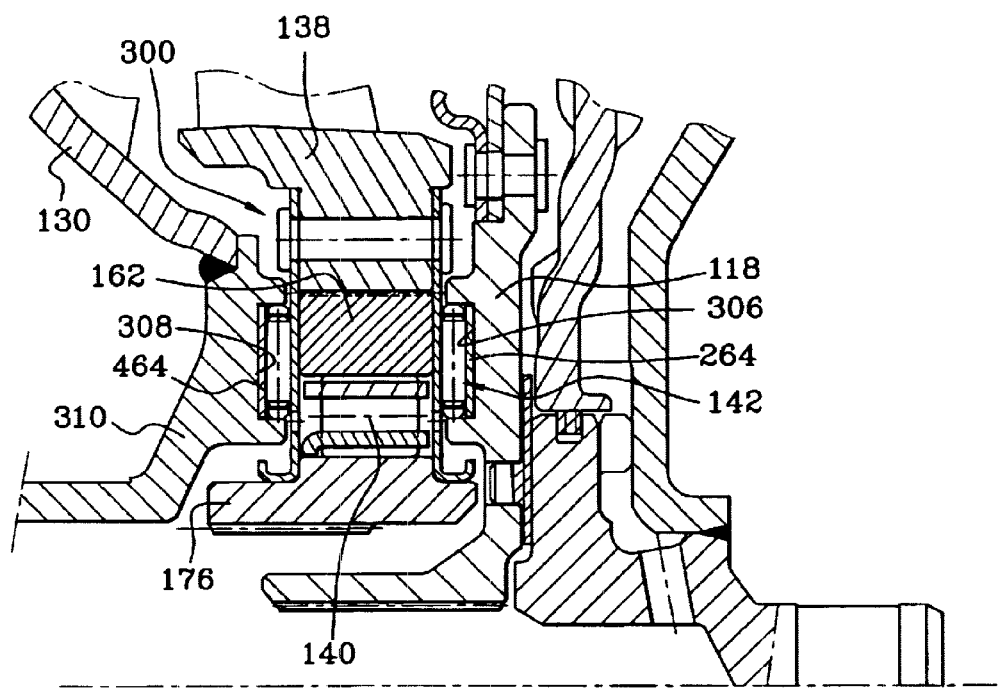
Figure 32:
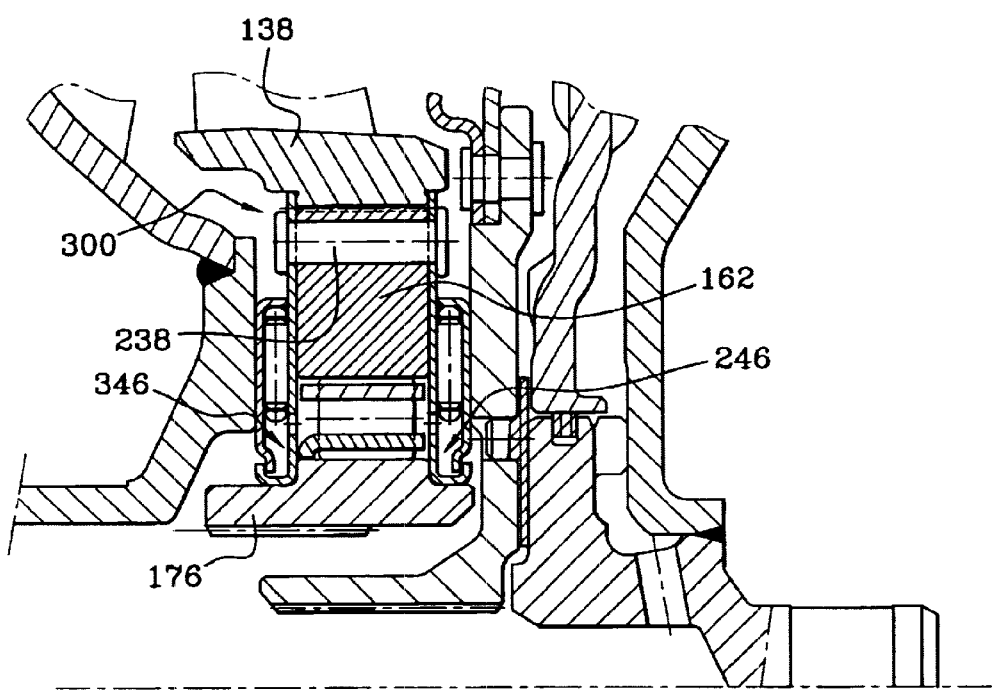
Figure 33:
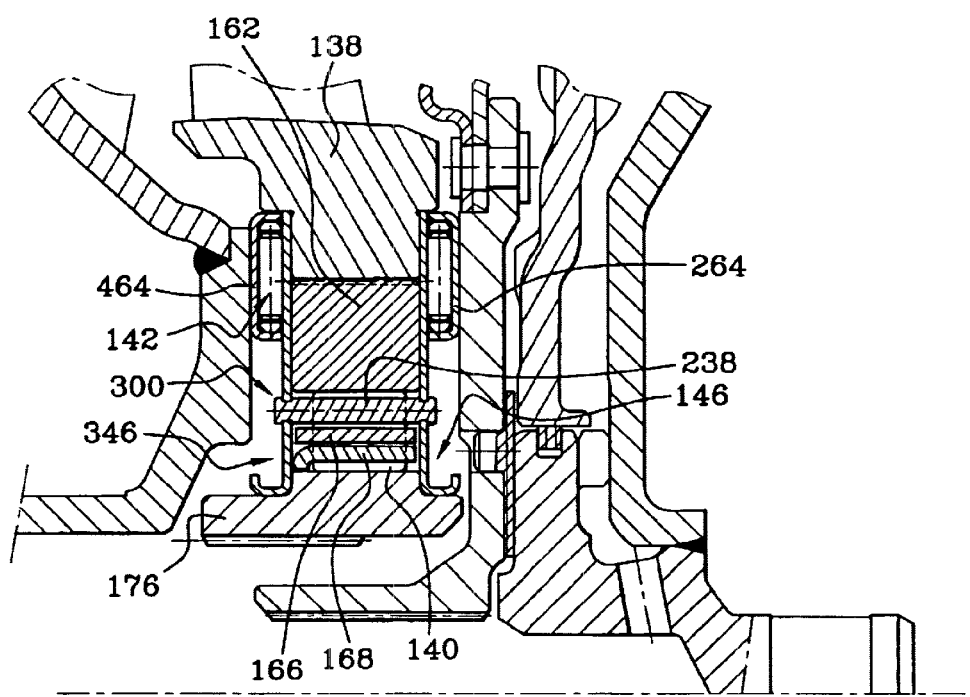
Figure 34:
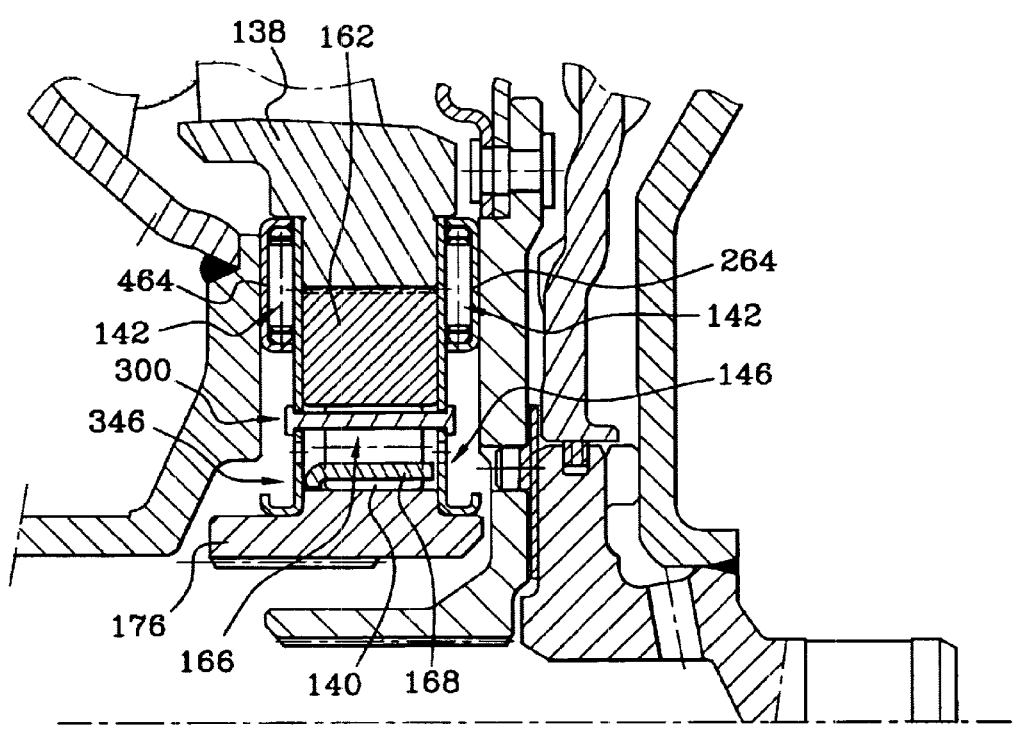
Figure 35:
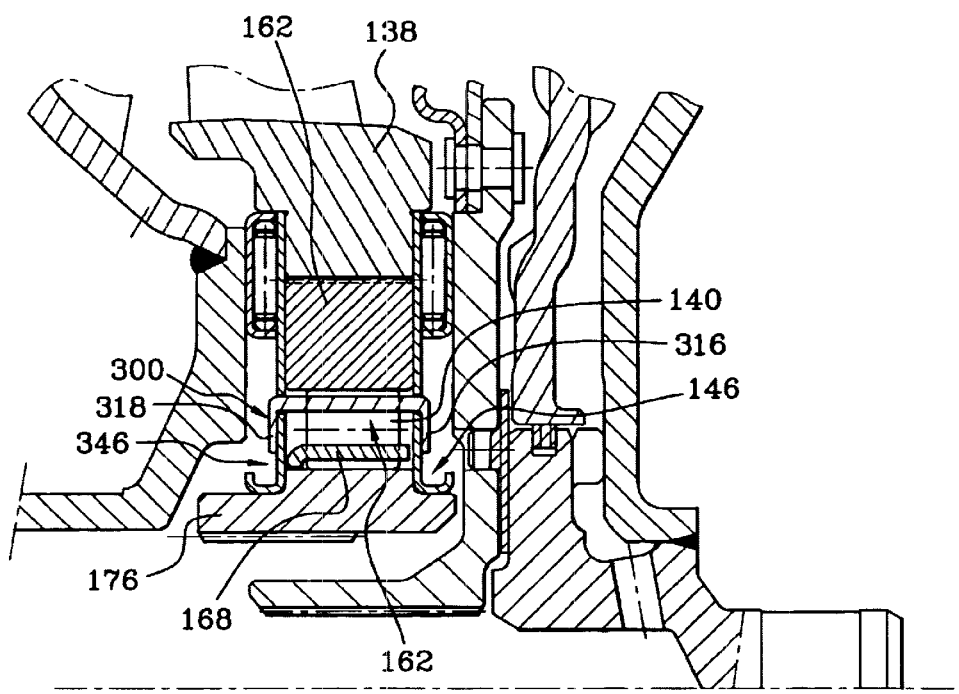
Figure 36:
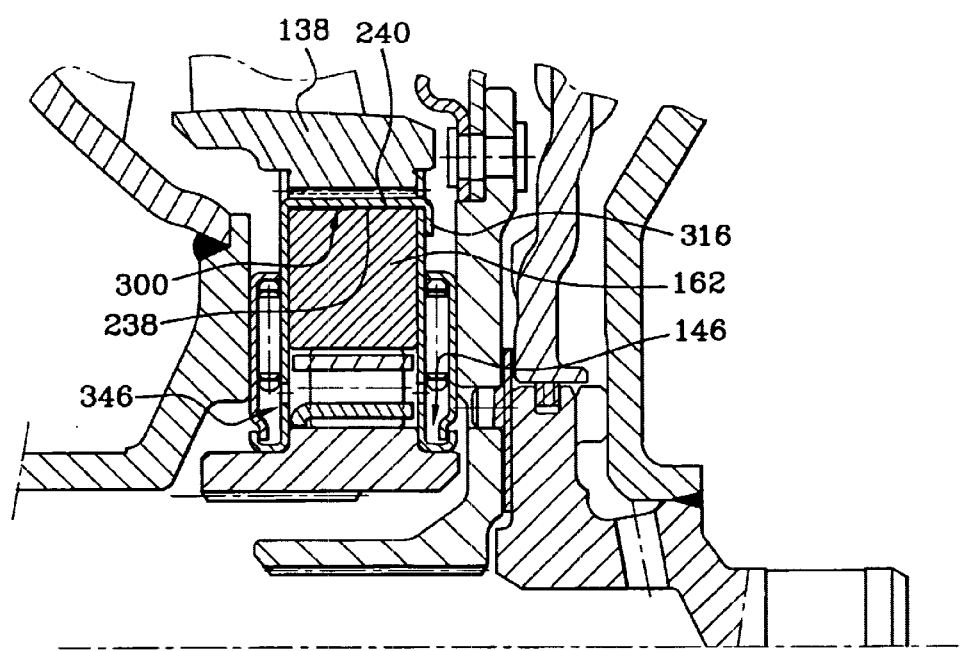
Figure 37:
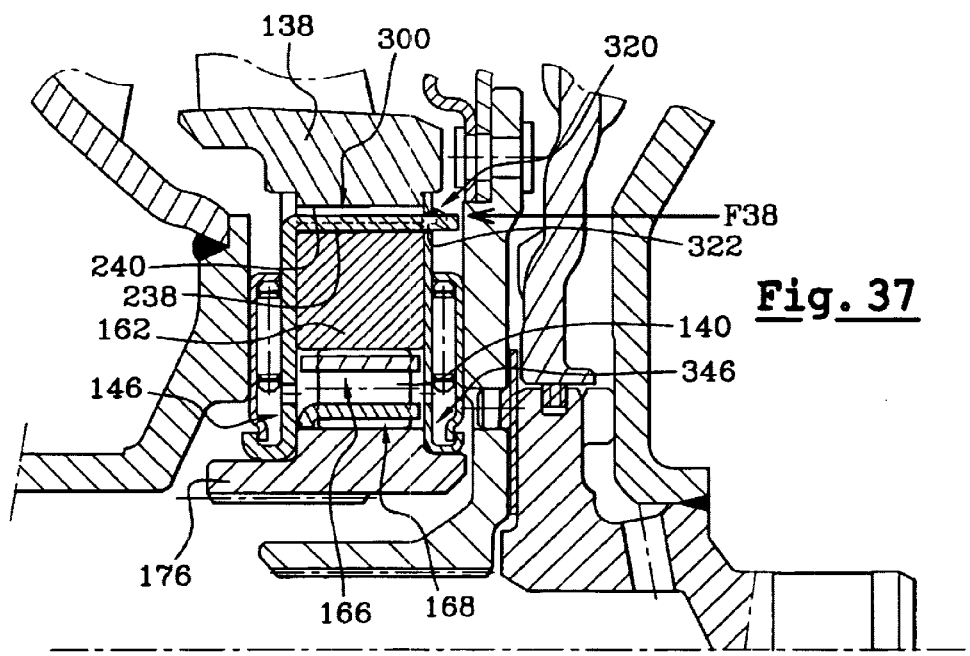
Figures 38, 39:
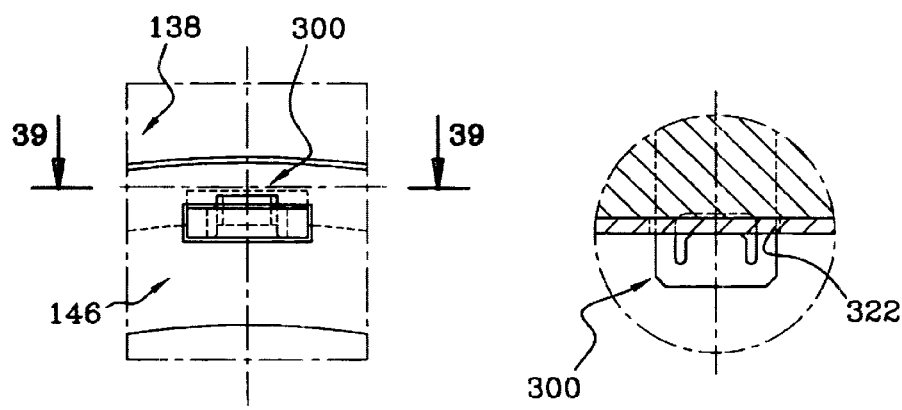

FIGS. 18 and 21 are views similar to those of FIGS. 3 and 4, which illustrate a second exemplary embodiment of the invention in which the free wheel includes two, front and rear, lateral flanges, with the front lateral flange driven in rotation by the reactor body and fastened axially by elastic clipping with the outer cage of the free wheel and with the rear lateral flange linked in rotation to the outer ring of the free wheel and fastened axially, by elastic clipping onto the outer cage, the front flange providing a link in axial translation between the reactor body and the inner ring and the rear lateral flange providing a link in axial translation and rotational guidance between these two elements;

FIG. 19 is a view similar to FIG. 18 in which the front lateral flange also provides rotational guidance between the reactor body and the inner ring of the free wheel;

FIG. 20 is a view similar to those of FIGS. 18 and 19 illustrating a design adapted to a free wheel called free wheel without inner ring, and in which only the rear lateral flange participates in the rotational guidance of the reactor body with respect to the fixed sleeve;

FIGS. 22 to 24 are views similar to those of FIGS. 18 to 20, which illustrate a variant embodiment of the rear lateral flange and of its means of fastening, by elastic clipping, onto the outer cage of the free wheel;

FIGS. 25 to 27 are views similar to those of FIGS. 22 to 24, which illustrate a design in which the front lateral flange is produced in a single piece with the outer cage of the free wheel;

FIG. 28 is a view similar to that of FIG. 18 which illustrates another exemplary embodiment with two, front and rear, lateral flanges, which are independent of the outer cage of the free wheel, which both participate in the linking in axial translation and in the rotational guidance of the reactor with respect to the inner ring of the free wheel, which are linked, in axial translation and in rotation, via their outer peripheries, to the reactor body via an operation of riveting by means of rivets which pass through the body of the reactor, and which furthermore constitute, via their front and rear transverse faces respectively, bearing tracks for axial, needle-type thrust bearings interposed between the reactor and the turbine wheel, and between the reactor and the impeller wheel respectively;

FIG. 29 is a view similar to that of FIG. 28, on which are represented needle-type thrust bearings, the needles of which roll on the said front and rear flanges and directly on tracks formed in the hub of the turbine wheel and in the hub of the impeller wheel respectively;

FIG. 30 is a view similar to that of FIG. 28 which illustrates a design in which the rivets provide the rotational link between the reactor body and the outer ring of the free wheel;

FIG. 30bis is a detailed view along the arrow F30bis of FIG. 30;

FIG. 31 is a view similar to that of FIG. 30, on which the rivets are replaced by axial spacers;

FIG. 31bis is a detailed view along the arrow F31bis of FIG. 31;

FIG. 32 is a view similar to that of FIG. 28, in which the rivets pass axially through the outer ring;

FIG. 33 is a view similar to that of FIG. 28, in which the rivets extend axially within the inner ring;

FIG. 34 is a view similar to that of FIG. 28, in which the rivets are produced in a single piece with the outer cage;

FIG. 35 is a variant embodiment of the design according to FIG. 34;

FIG. 36 is a view similar to that of FIG. 30, which illustrates a design in which the crimped elements forming rivets are produced in a single piece with the rear lateral flange;

FIG. 37 is a view similar to that of FIG. 38 which illustrates a variant embodiment in which the front extremities of the rivet-forming elements are clipped elastically into the front transverse flange;

FIG. 38 is a detailed view on a larger scale along the arrow F38 of FIG. 37;

and FIG. 39 is a detailed view in section along the line 39—39 of FIG. 38.

In the description which will follow, identical, similar or analogous components or elements will be designated by the same reference numbers.

In order to facilitate the authoring and the understanding of the description and of the claims, the terms front, rear, upper and lower, will be used in a non-limiting way, particularly as regards the figures.

Figure 1:
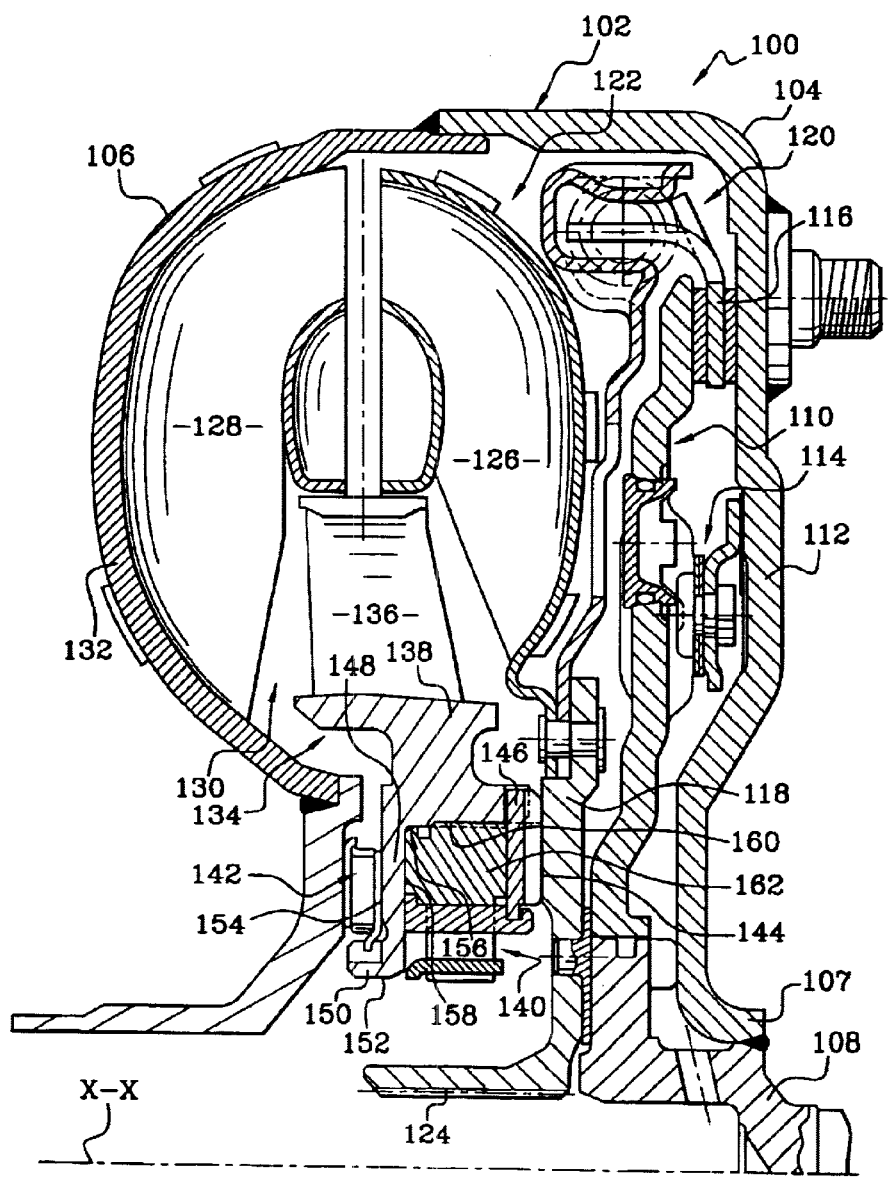
FIG. 1 is a half-view in axial section of a hydrokinetic coupling apparatus, in which the reactor body with its free wheel is produced in accordance with the state of the art.

A hydrokinetic coupling apparatus 100, of a generally well known design, has been represented in FIG. 1.

The apparatus has an axis of revolution X-X, and it includes a casing 102 in two front 104 and rear 106 parts, that is to say in two right-hand and left-hand parts when considering FIG. 1.

In a known way, the front part 104 of the casing 102 is linked in rotation, by its inner radial part 107, to the crankshaft of the combustion engine (not represented) by way of a central ring 108 which carries the means for sealing between the driven shaft and the bridging piston 110 which is linked in rotation, with the possibility of axial movement, to the front transverse wall 112 of the front part 104 of the casing 102 by elastic strips 114.

The bridging piston 110 can axially clamp an annular friction disk 116 with two opposite faces, between itself and the wall 112, the disk 116 being linked in rotation to a hub 118 by way of an elastic damping device 120.

The hub 118 constitutes the hub of a front turbine wheel 122 which is linked in rotation to a driven shaft (not represented), coaxial with the axis X-X, by way of splines 124 of the hub 118.

The vanes 126 of the front turbine wheel 122 are designed to interact, in a known way, with the vanes 128 of a rear impeller wheel 130, the body of which consists of the inward-curved transverse wall 132 of the rear part 106 of the casing 102.

In a known way, a reactor 134, with vanes 136, is interposed axially between the front turbine wheel 122 and the rear impeller wheel 130.

The reactor 134 includes a solid body arranged radially towards the inside, and the radially inner central part 138 of which, in the form of a cylindrical ring, is linked in rotation to a fixed sleeve (not represented) by way of a free wheel 140.

In order to allow the relative rotation of the reactor 134 with respect to the front turbine wheel 122 and to the rear impeller wheel 130, thrust-bearing means are interposed axially between these three components, and they include, for example, a rear, needle-type axial thrust bearing 142 and, in the various designs which are illustrated in the figures, by [sic] the front transverse face 144 of a front lateral flange 146 of the free wheel 140.

The embodiment example according to the state of the art illustrated in FIG. 1 is of a design in which the free wheel 140 does not include an inner ring, the latter being replaced by a portion of the complementary fixed sleeve of the free wheel 140.

The central part 138 of the reactor body 134 includes a rear lateral cheek 148 of generally transverse orientation, which extends radially inwards and which is extended by a bush of axial orientation which extends rearwards, the inner concave cylindrical bearing surface 152 of the bush 150 participating in the mounting of the part 138 of the reactor 134 in rotation with respect to the inner ring of the wheel 140, or directly with respect to a complementary portion of the fixed sleeve (not represented) when, as is the case for example in FIG. 1, the wheel 140 does not include an inner ring proper, that is to say one produced in the form of an independent component.

The rear transverse face 154 of the rear lateral cheek 148 constitutes an axial support face for the needle-type thrust bearing 142.

The central part 138 of the reactor 134 delimits an internal cavity or housing 156 which is delimited axially rearwards by the front transverse face 158 of the cheek 148 and by a concave inner cylindrical surface 160, the cavity 156 thus opening out axially towards the front.

The cavity 156 receives an outer, annular, cylindrical free-wheel ring 162 which is toothed externally and which is force-fitted into the cylindrical bearing surface 160 so as to link the outer ring 162 in rotation to the body 138 of the reactor 134.

The axial positioning of the outer ring 162 with respect to the central part 138 including the cavity 156 is determined by the rear transverse face 164 of the outer ring 162 coming into abutment against the facing portion of the front transverse face 158 of the rear lateral cheek 148 (see FIG. 3).

The cavity 156 also receives a radially outer cage 166 and a radially inner cage 168 which have the function of positioning, at an angle with respect to one another, and of axially retaining, intermediate blocking elements 170 belonging to the free wheel 140, and which are designed to interact with an outer track 172 of the outer ring 162 and with an inner track 174.

Figure 2:
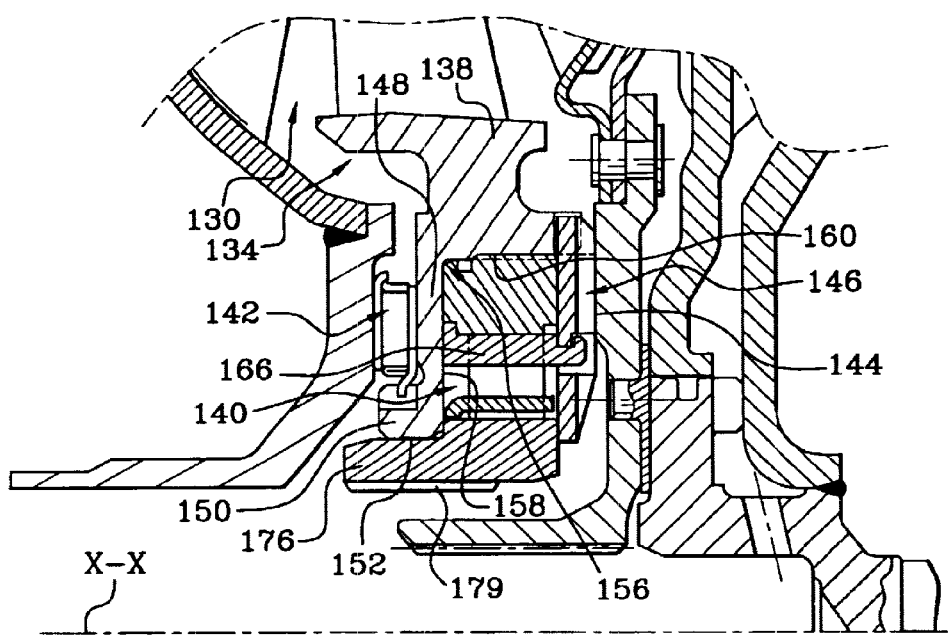
FIG. 2 is a view similar to that of FIG. 1, which illustrates a first exemplary embodiment of the invention including a front lateral flange for linking the reactor body, in axial translation, with the inner free-wheel ring, which illustrates the rotational linking of the front flange with the reactor body, and its axial fastening by elastic clipping onto the outer cage of the free wheel.

The inner track with which intermediate blocking elements 170 interact may belong to the portion of the fixed sleeve performing the function of inner ring, but it may also belong directly to an inner ring 176 of the free wheel 140 of the type which is illustrated, for example, in FIGS. 2 to 4, which is a component in the general shape of a cylindrical bush or sleeve which includes internal axial splines 179 for its rotational linking with a complementary splined part of the fixed sleeve (not represented).

Figure 6:
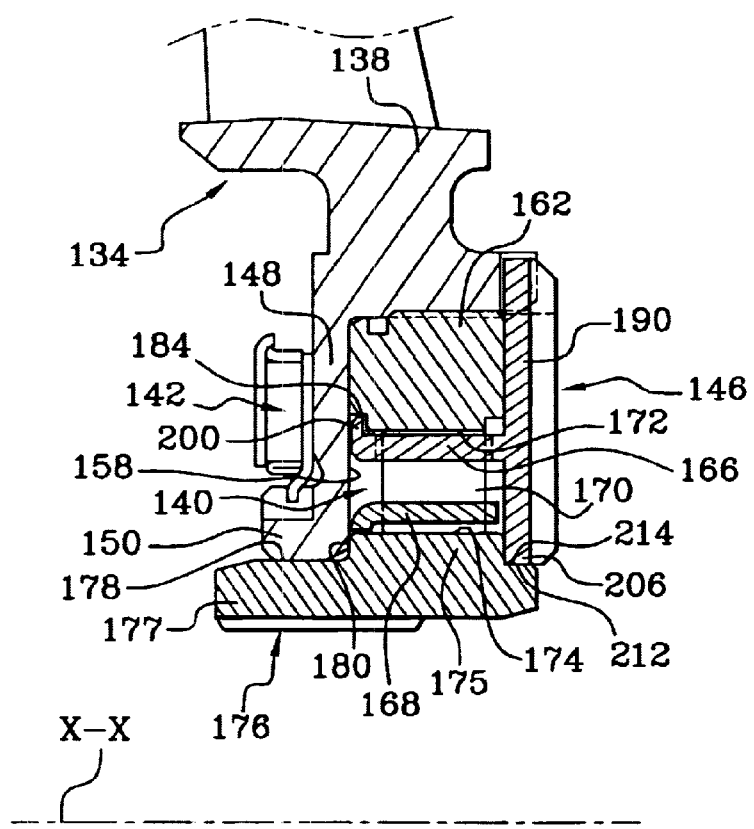
FIG. 6 is a view similar to that of FIG. 3, on which the front lateral flange for linking in axial translation and for rotational guidance is produced in a single piece with the outer cage of the free wheel.

As can be seen, for example, in FIGS. 2 and 3, the outer periphery of the inner ring 176 is stepped, that is to say that it includes a front axial segment 175 of large diameter which delimits the outer track 174 and a rear segment 177 of smaller diameter which delimits a convex cylindrical bearing surface 178 which interacts with the bush 150 of the cheek 148 so as to carry out a function of rotational guidance of the body 138 of the reactor 134 with respect to the inner ring 176 (see FIG. 6).

The shoulder 180 which axially delimits the front, large-diameter segment 175 and rear, small-diameter segment 177 of the stepped inner ring 176 of the free wheel 140 interacts with a facing portion of the front transverse face 158 of the cheek 148 so as to position the reactor 134 axially with respect to the inner ring 176.

Figure 5:
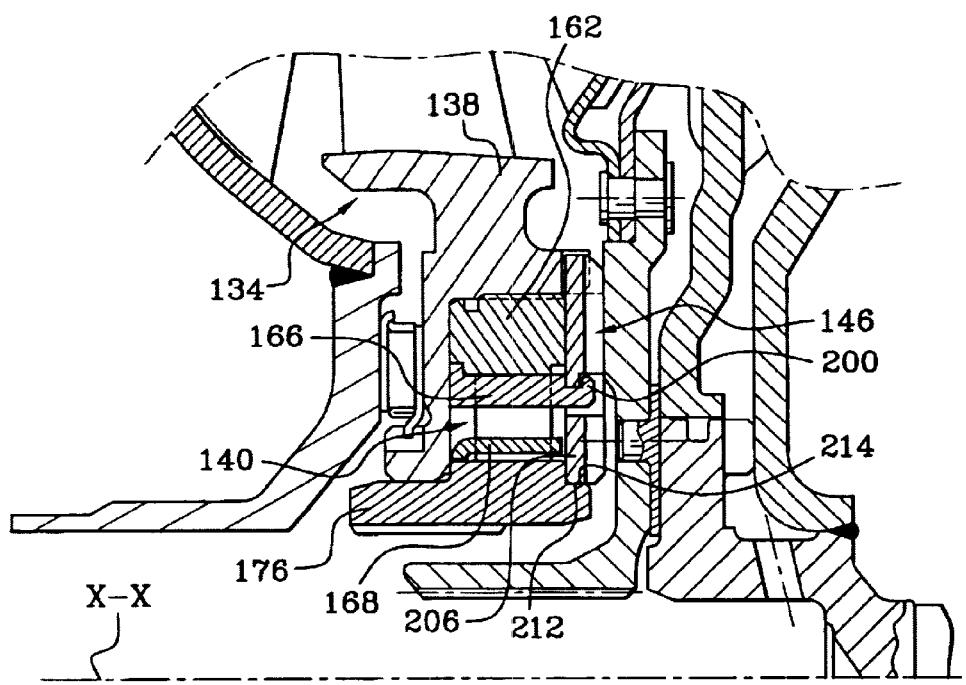
FIG. 5 is a view similar to that of FIG. 2, on which the front lateral flange participates in the guiding of the reactor body in rotation with respect to the inner ring of the free wheel.

In the designs illustrated especially in FIGS. 3 to 5, the outer cage 166 is an independent component of generally tubular shape, the rear axial extremity of which includes a stub 182, which extends radially outwards and which is accommodated in a complementary inner radial groove 184 of the surface 172 of the outer ring 162 so as to immobilise the outer cage 166 axially with respect to the central part 138 of the reactor body 134.

The inner cage 168 is a component of generally tubular shape which is accommodated axially, with the intermediate blocking elements 170, in the cavity 156.

The front lateral flange 146 is a generally washer-shaped component which extends in a transverse plane perpendicular to the axis X-X and which includes a series of ribs 186 which are formed in relief, extending axially forwards from the front transverse face 188 of the body 190, in disk or washer form, of the front flange 146, the front transverse faces of the ribs 186 constituting the front transverse face 144 of the flange 146 which bears axially, to the front, against the hub 118.

In line with each rib 186, the front flange 146 includes a projecting part 192 which extends radially outwards and which constitutes a catch for providing the rotational link between the front flange 146 and the central part 138 of the reactor 134, by being accommodated in a complementary recess 194 formed opposite in the central part 138, the recess 194 opening out axially to the front in such a way as to allow the axial introduction, from front to rear, of the catches 192 into the recesses or notches 194.

In the exemplary embodiments illustrated in FIGS. 1 to 5, the front lateral flange 146 is retained axially with respect to the reactor 134 by being fastened axially onto the front axial extremity 196 of the outer cage 166 which is itself immobilised axially with respect to the reactor 134 as was explained before.

To that end, the annular transverse edge of the front extremity 198 of the outer cage 166 is extended by hooks 200, here four in number, like the ribs 186, each of which is accommodated, by clipping by elastic deformation, into a complementary hole forming a fastening notch 202 configured opposite in the body 190 in the form of a washer of the front lateral flange 146.

Thus, in accordance with the teachings of the invention, and as can be seen in section in the figures, the means for axially retaining the flange take the form of at least one rod-shaped element which extends axially, here within the outer ring 162.

In accordance with another characteristic of the invention, and as can be seen especially in FIGS. 2 to 4, the washer-shaped body 190 extends radially inwards, that is to say towards the axis X-X, in such a way that its inner peripheral part 206, generally in the shape of an annular disk, extends axially opposite the inner ring 176.

More precisely, the annular rear transverse face 208 of the inner peripheral part 206 extends opposite and interacts with a facing portion of the front annular transverse face 210 of the inner ring 176.

Thus, the front lateral flange 146, which is retained axially with respect to the reactor 134, interacts with the inner ring 176 so as to link the body 138 of the reactor 134 in axial translation with the inner ring 176, the large-diameter front axial segment 175 of which is thus "trapped" axially between the rear lateral cheek 148 of the reactor 134 and the front lateral flange 146.

In accordance with another characteristic of the invention, and as represented in FIG. 5, the radially inner peripheral part 206 of the flange 146 can also participate in the rotational guidance of the body 138 of the reactor 134 with respect to the inner ring 176.

To that end, the concave inner annular cylindrical edge 212 of the peripheral part 206 surrounds and interacts with a complementary convex outer cylindrical bearing surface 214 formed at the front axial extremity of the large-diameter segment 175 of the inner ring 176.

In fact, the flange 146 is itself centred with respect to the axis X-X, here in the region of the hooks 200 which belong to the outer cage 206, itself centred with respect to the outer ring 162 of the free wheel 140, and it is therefore centred with respect to the body 138 of the reactor 134, and the interaction of the flange 146 via its inner periphery 206 with the bearing surface 214 thus provides complementary rotational guidance of the reactor 134 with respect to the inner ring 176.

The design represented in FIG. 6 will now be described.

By comparison with the design represented in FIG. 5, it is observed that the front flange 146 is identical from the functional point of view, that is to say that it participates in the linking in axial translation and in the rotational guidance of the reactor 134 with respect to the inner ring 176, but here it is produced in a single piece, for example by moulding from plastic material, with the outer cage 166 of the free wheel 140.

The stub 182 formed at the rear axial extremity of the cage 166 is replaced by a series of hooks 200, which, for example, are distributed at regular angles, or which are produced in the form of a continuous fastening crown ring and which are accommodated in the groove 184 of the outer ring 162 in such a way as to achieve axial retention of the outer cage 166 and the front lateral flange 146, which are produced in a single piece.

As before, the axial fastening of the front flange 146 and of the outer cage 166 is carried out by elastic clipping, that is to say the outer cage 166, with its hooks 200, is deformed elastically when it is introduced axially, from front to rear, within the outer ring 162, the hooks 200 being chamfered for this purpose in order to facilitate their axial insertion and their elastic deformation.

The groove 184 thus carries out the same function as the notches 202 mentioned above.

Figure 7:
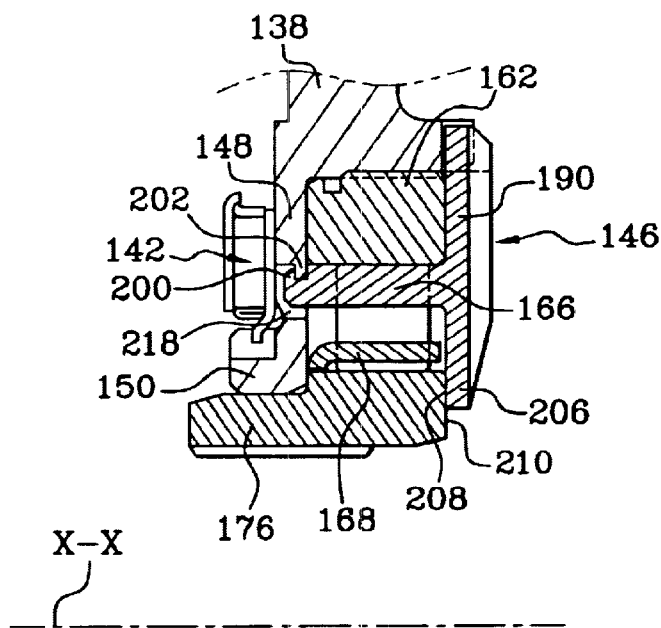
FIG. 7 is a view similar to that of FIG. 3, on which the front lateral flange for linking in axial translation is produced in a single piece with the outer cage of the free wheel, and is fastened axially, by elastic clipping, onto a rear transverse cheek of the central part of the reactor body.
Figure 8:
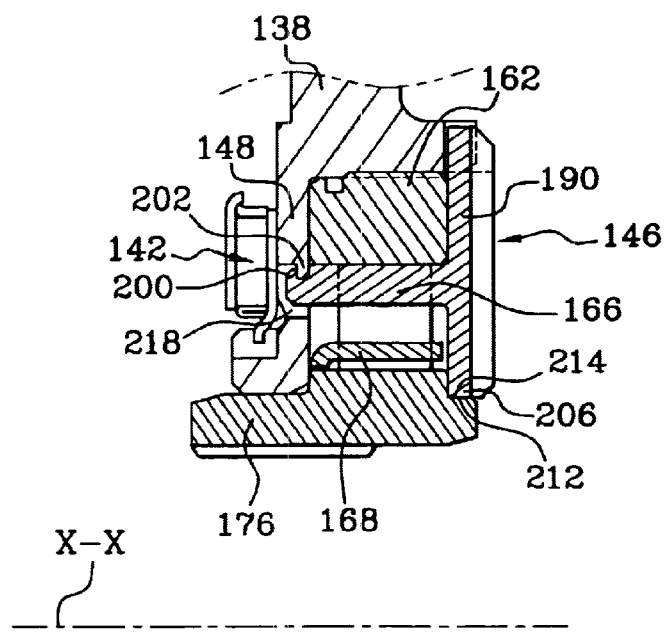
FIG. 8 is a view similar to that of FIG. 7, on which the front lateral flange also provides rotational guidance of the reactor body with respect to the inner ring.

If the design represented in FIGS. 7 and 8 is compared with that of FIG. 6, it is observed that the single component associating the outer cage 166 and the front lateral flange 146 is fastened axially by elastic clipping, no longer with respect to the outer ring 162, but directly onto the rear lateral cheek 148 of the body 138 of the reactor which, to this end, includes axial through-holes 218 in order to constitute fastening notches 202 similar to the notches 202 formed in the lateral flange 146 of the designs illustrated in FIGS. 1 to 5.

As before, the hooks 200 are chamfered in order to facilitate the axial insertion and the fastening by elastic clipping of the outer cage 166 into the notches 202 which are themselves chamfered opposite.

Figure 9:
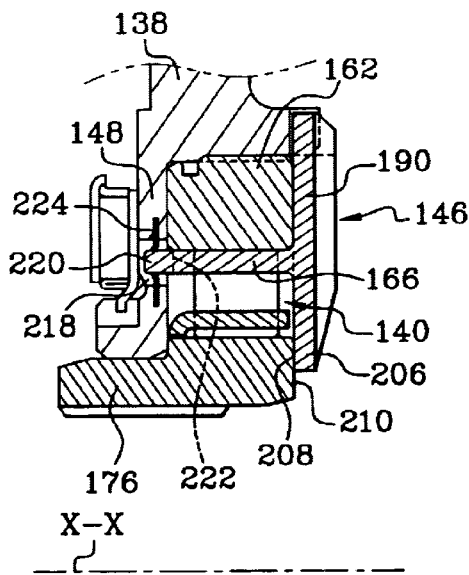
FIGS. 9 and 10 are views similar to those of FIGS. 7 and 8, which represent a variant of the means for fastening the front lateral flange, integrating the outer cage, onto the rear lateral cheek of the reactor body.
Figure 10:
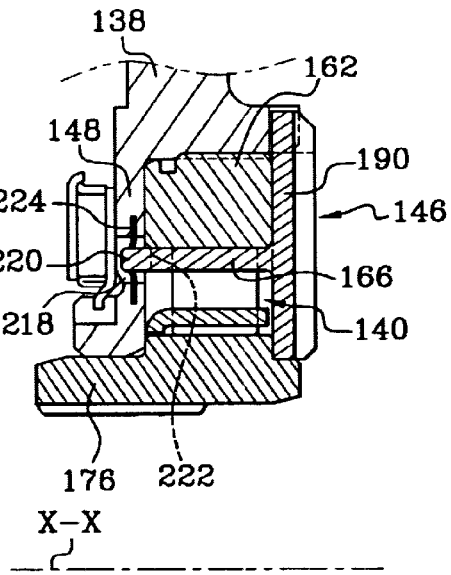

The design represented in FIGS. 9 and 10 differs from that represented in FIGS. 7 and 8 in that the axial fastening of the single piece 146–166 is carried out no longer by hooks, but by series of spigots 220, distributed at regular angles, which extend axially rearwards from the annular transverse edge of the rear extremity 222 of the outer cage 166 and each of which extends axially into an opposite hole 218 of the lateral cheek 148 of the reactor 138. Each spigot 220 is gripped on the outside by a complementary clip washer 224 which belongs to the cheek 148 and which extends radially into the hole 218.

Thus, the fitting of the component 146–166 still takes place axially from front to rear, the spigots 220 penetrating progressively into the clip washers 224 in which they are retained axially in such a way as to be practically irremovable.

Figure 11:
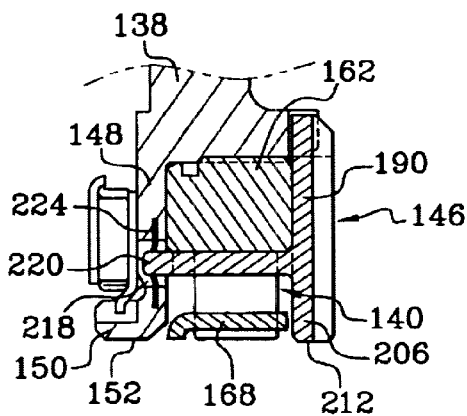
FIG. 11 is a view similar to that of FIG. 10 illustrating an embodiment of the reactor associated with a free wheel called "free wheel without inner ring", that is to say in which the inner ring consists of a portion of the fixed sleeve.

FIG. 11 illustrates the same design as those of FIGS. 9 and 10, adapted to a free wheel 140 without inner ring, that is to say one in which the radially inner axial bush 150 of the cheek 148 and the inner concave cylindrical annular edge 212 of the inner peripheral part 206 of the flange 146 interact with a corresponding portion of the fixed sleeve (not represented) so as to ensure correct rotational guidance of the reactor 138 with respect to the corresponding portion of the fixed sleeve performing the function of inner ring of the free wheel 140.

The design illustrated in FIGS. 12 to 14 can be compared with that illustrated in FIGS. 9 to 11, in that the single component forming the front lateral flange 146 and outer cage 166 is retained axially with respect to the body 138 of the reactor, being retained axially, by way of the rear axial extremity of the outer cage 166, directly with respect to the rear lateral cheek 148 of the body 138.

To that end, the annular transverse edge of the rear extremity 222 of the outer cage 166 is extended by a series of axial spigots 220, rearwards, each spigot being accommodated in a complementary hole of axial orientation 218 of the cheek 148.

The free rear axial extremity of each spigot is then crimped, for example hot-crimped, so as to constitute a head 232 of larger diameter which, in the same way as a rivet head, constitutes the member for axial retention of the spigot 220, and thus of the outer cage 166 and of the front lateral flange 146 with respect to the cheek 148, the holes 218 being stepped with a rear axial end segment of larger diameter 234 in order to allow deformation of the head 232.

Figures 15, 16:
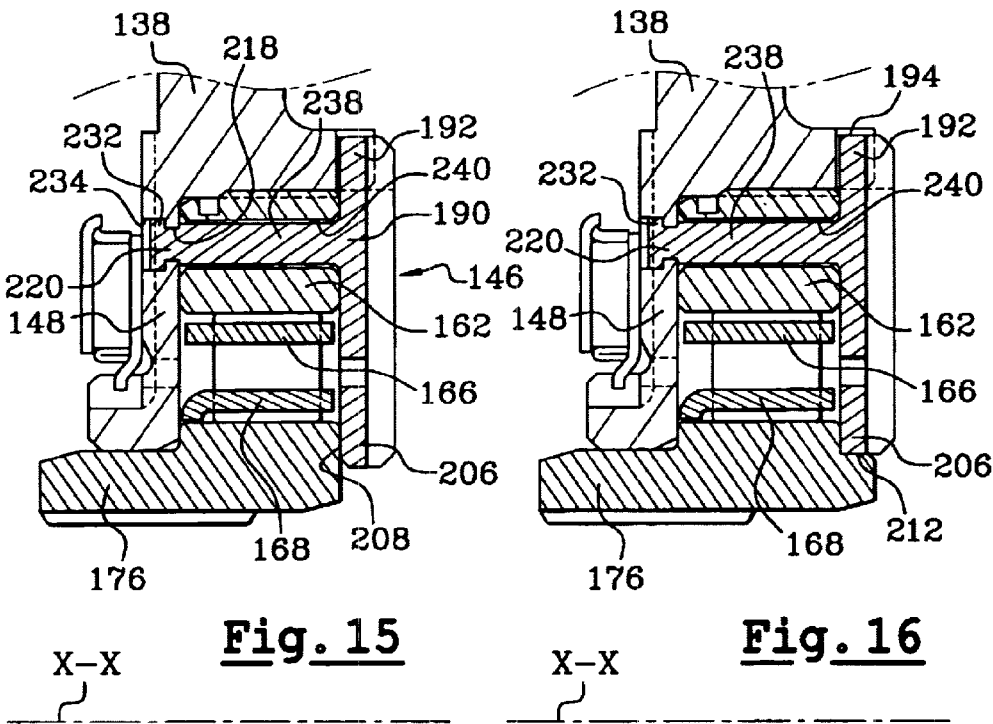
FIGS. 15 to 17 are three views similar to those of FIGS. 12 to 14, in which the front lateral flange is independent of the outer cage of the free wheel and includes means for its axial fastening onto the rear lateral cheek of the central part of the reactor body which are of the same type as those illustrated in FIGS. 12 to 14.
Figure 17:
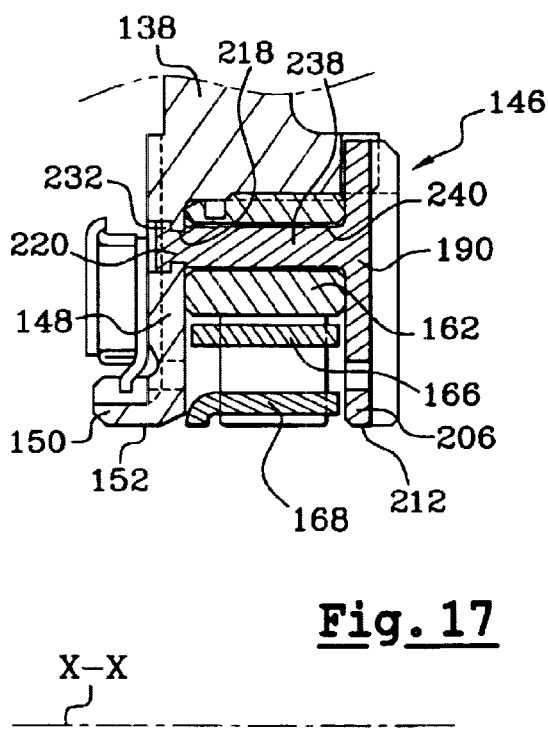

If the design illustrated in FIGS. 15 to 17 is compared with that described previously with reference to FIGS. 12 to 14, it is observed that the front lateral flange 146 is again a component which is independent of the outer cage 166.

For the axial retention of the flange 146 with respect to the body 138 of the reactor 134, the latter includes a series of rods 238 of axial orientation, distributed at regular angles, for example, which extend axially rearwards from the rear transverse face of the washer-shaped body 190 of the front flange 146 and which extend through complementary axial through-holes 240 formed opposite, here in the body of the outer ring 162, in a variant in the body 138 of the reactor 134.

After having passed through the holes 240, the rods 238 are extended by axial end spigots 220, similar to the spigots 220 of the cage 166 illustrated in FIGS. 15 to 17, the end heads 232 of which are crimped in the same way as before, in holes of larger diameter 234 formed opposite in the lateral cheek 148 which, needless to say, includes holes 218 for the passage of the spigots 220 at the rear axial extremity of the rods 238.

The rotational linking of the front flange 146 with respect to the body 138 of the reactor can be provided by the rods 238 which pass through holes 240 of the outer ring 162 which is itself linked externally in rotation to the body 138, but it can also be provided and/or supplemented by the catches 192 accommodated in the notches 194.

According to this design, it is observed that the outer cage 166 is of a particularly simple tubular shape.

The design illustrated in FIGS. 18 to 21 is the first one which includes two, front and rear, attached lateral flanges which are of similar designs and which participate in the linking in axial translation and in the rotational guidance of the body 138 of the reactor 134 with respect to the inner ring 176.

The rear lateral flange, and its parts which are identical or similar to those of the front lateral flange 146, are designated by the same reference numbers as the front flange, the lateral flange 146 increased by two hundreds.

The rear flange 346 thus "replaces" the rear lateral cheek 148 of the body 138, that is to say that the annular cylindrical body 138 includes, at its rear axial extremity 430, an inner radial groove 458.

In all the examples of design of the second rear lateral flange 346 represented in the figures, its radially inner periphery is similar to that of the rear lateral cheek 138 set out above, that is to say that it includes a bush 150, 152.

In FIGS. 18 to 21, the lateral flange 146 is of the same type as that of FIGS. 3 to 5, while the rear lateral flange 346 is of the same type as the lateral flange 146 illustrated in FIGS. 3 to 5 from the point of view of its axial fastening by elastic clipping onto the outer cage 166 and of the same type as the lateral flange 146.

The design illustrated in FIGS. 22 to 24 is similar to that of FIGS. 18 to 21, with the exception of the outer cage 166 which is simpler, with the hooks 200 and 400 aligned in angle, whereas they are offset in angle in the preceding design.

In the design represented in FIGS. 25 to 27, the lateral flange 146 is similar to that illustrated in FIGS. 7 and 8 with its hooks 200, belonging to the outer cage 166, which are hooked into notches 202 of the rear lateral flange 346 rear [sic], the latter thus itself also being retained axially with respect to 166, that is to say that the hooks 200–400 have a double function of axial retention by elastic clipping of the two front 146 and rear 346 flanges with respect to the body 138.

The design illustrated in FIG. 28 is similar overall to that illustrated in FIGS. 18 to 27 in that it includes two front 146 and rear 346 lateral flanges fixed to the body 138 of the reactor 134, here by crimping of their outer peripheral crown rings 254 and 454.

In contrast, it is two metal parts which are involved, made of sheet metal, produced by cutting-out and forging and stamping, for example.

It is thus possible to make use of two flanges made of hard material, the outer lateral faces of which, respectively front 144 and rear 344 faces, may each constitute an annular bearing track for an associated needle-type axial thrust bearing 142.

As can be seen in FIG. 28, the flanges 146 and 346 participate in the axial retention of the outer annular plates, respectively front plate 264 and rear plate 464, of the thrust ballbearings 142.

As can be seen in FIG. 28, the radially outer peripheral crown rings 254 and 454 are traversed axially by the shanks 238 of rivets 300 which also pass through complementary holes 240 formed for this purpose through the central part of the reactor body 138.

The rivets thus provide for the axial retention of the two front 146 and rear 346 flanges as well as their immobilisation in rotation with respect to the reactor body, while the outer ring is linked in rotation to the reactor body via its toothed outer peripheral surface.

The needles are arranged radially inwards with respect to the rivets, in such a way that they interact with smooth tracks which are not affected by the axial crimping of the rivets.

This design is particularly advantageous because of the great simplicity of forms and of manufacture of the various components, and especially of the outer ring 162 and of the central part of the reactor body which requires only the machining of the lateral faces 302 and 304 for the axial support of the crown rings 254 and 454 and the piercing of the holes 240.

By comparison, in FIG. 29, it is seen that the needles 142 roll on tracks belonging to front 264 and rear 464 annular plates which are of reduced dimensions and which are no longer retained by the corresponding front 146 and rear 346 flanges.

In fact, these flanges each take the form of a flat ring of radial orientation which is accommodated in a complementary housing 306, 308 formed respectively in the hub 118 of the turbine wheel, and in the hub 310 of the impeller wheel 130.

The housings 306 and 308 are also designed to accommodate the needles 142 and to retain them radially in both directions, in a variant without the plates 264, 464.

In the variant embodiment illustrated in FIGS. 30 and 30bis, the rivets 300, the design of which is similar to that illustrated in FIGS. 28 and 29, are arranged "between hide and flesh" between the outer ring 162 and the reactor body 138 so as to provide for the rotational linking of these two components.

To that end, and as can be seen especially in FIG. 30bis, the axial holes for the passage of the shanks 238 of the rivets 300 are formed in two halves in the convex outer periphery of the outer ring 162 and in the concave inner periphery of the central part of the reactor body 38.

It is also seen in these figures that the peripheral crown rings of the flanges are of reduced dimensions radially outwards and that they include notches 312 in a semicircle which are open radially outwards for the passage of the shanks 238 and the rotational link of the flanges with the outer ring 162 and the body 138.

In the variant embodiment represented in FIG. 31 the rivets 300 are replaced by flat spacers including pairs of heads 314 for axial retention of the flanges 146 and 346, while the holes 240 are passages with a shape adapted to that of the body 238 of the spacers.

In the embodiment of FIG. 32, which is similar overall to that of FIG. 28, the rivets 314 extend axially through the body of the outer ring 162 in holes 240 formed for this purpose. It is seen that the outer ring is dimensioned for this purpose, while the inner diameter of the central part of the reactor body is increased.

Still coming radially closer to the inside, it is seen, on the embodiment represented in FIG. 33, that it is possible to arrange the rivets 300 in such a way that they extend axially through the outer ring 162 of the free wheel, being arranged between the bearing elements and radially outside the outer cage 166.

This design makes it possible to arrange the needles 142 radially outwards with respect to the rivets.

It is, needless to say, not necessary to form holes 240 for the rivet shanks to pass through, except, clearly, in the flanges 146 and 346.

The embodiment illustrated in FIG. 34 is similar to the preceding one, but the rivets 300 are produced in a single piece with the outer cage 166, that is to say as in the design illustrated in FIGS. 22 to 24.

In the variant embodiment illustrated in FIG. 35, the rivet heads are replaced by lugs 316 and 318 folded over radially inwards.

In the embodiment illustrated in FIG. 36, the rivets consist of lugs 300 produced in a single piece with the rear lateral flange 346 and they extend axially "between hide and flesh" between the reactor body 138 and the outer ring 162, providing the rotational link as in the case of FIG. 30.

Finally, the design illustrated in FIGS. 37 to 39 is similar to that of FIG. 36, but the front free extremities of the rivet-forming rods 238 are clipped elastically into holes 322 of the front flange 246.

The invention is not limited to the embodiments illustrated in which the free wheel includes an outer cage and an inner cage. It finds an application especially in the case of a free wheel with roller bearings without outer and inner cages.

What is claimed is:

1. Hydrokinetic coupling apparatus (100), for a motor vehicle, including a casing (102) suitable for being linked in rotation to a driving shaft, a front turbine wheel (122) housed within the casing (102, 104, 106), integral with a hub (118), suitable for being linked in rotation to a driven shaft and which is driven, by virtue of the circulation of fluid contained in the casing, by a rear impeller wheel (130, 128, 132), linked in rotation to the casing (106), with the intervention of a reactor (134, 136, 138), arranged axially between the front turbine wheel (122) and rear impeller wheel (130), including a reactor body the central, radially inner, part (138) of which is linked in rotation to a fixed sleeve which passes through it with the interposition of a free wheel (140) including:

an outer ring (162) linked in rotation to the central part (138) of the reactor body (134);

intermediate elements (170) which interact with an outer track (172) of the outer ring (162) and with an inner track (174) of an inner ring (176) of the free wheel (140) which is linked in rotation to a fixed sleeve;

and at least one affixed lateral flange (146, 346), in the general shape of a washer (190, 390) of transverse orientation, perpendicular to the axis (X-X) of the free wheel, which is immobilized axially with respect to the central part (138) of the reactor body and which extends radially inwards beyond the outer ring (162) in order to retain the intermediate elements axially, in at least one direction;

and in which the said at least one lateral flange (146, 346) extends radially inwards in such a way as to interact, via its inner periphery (206, 150), with a facing portion of the inner ring (176) so as to link the reactor body (138) in axial translation with the inner ring (176) and/or to guide the reactor body (138) in rotation with respect to the inner ring (176), wherein, for the axial retention of the flange (146, 346), at least one, generally rod-shaped, element is provided, which passes axially, at least partly, through the outer ring (162) of the free wheel or the body of the reactor (138).

2. Hydrokinetic coupling apparatus according to claim 1, characterised in that the inner ring (176) is traversed axially by the fixed sleeve to which it is linked in rotation.

3. Hydrokinetic coupling apparatus according to claim 1, characterised in that the inner ring consists of a portion of the fixed sleeve.

4. Hydrokinetic coupling apparatus according to claim 1, characterised in that the free wheel (140) includes only a single lateral flange (146), and in that the central part of the reactor (138) includes a lateral cheek (148) of transverse orientation perpendicular to the axis of the free wheel, opposite the said single flange (146), which, with the latter, axially delimits a cavity (156) in which are arranged the outer ring (162) and the intermediate elements.

5. Hydrokinetic coupling apparatus according to claim 1, characterised in that the free wheel includes another attached lateral flange (346), in the general shape of a washer, of transverse orientation perpendicular to the free wheel, which is immobilized axially with respect to the central part of the reactor body (138), which extends radially inwards beyond the outer ring (162) so as to retain the intermediate elements axially, in at least one direction, which is opposite the said at least one lateral flange (146), and which, with the latter, axially delimits a cavity (156) in which are arranged the outer ring (162) and the intermediate elements.

6. Hydrokinetic coupling apparatus according to claim 5, characterised in that the said other lateral flange (346) extends radially inwards so as to interact, via its inner periphery (150, 152), with a facing portion of the inner ring so as to link the reactor body (138) in axial translation with the inner ring (176) and/or to guide the reactor body (138) in rotation with respect to the inner ring (176).

7. Hydrokinetic coupling apparatus according to claim 4, characterised in that the free wheel includes at least one outer cage (166) which axially retains the intermediate elements, and in that the lateral flange (146, 346) is an element independent of the outer ring (162) and of the outer cage (166).

8. Hydrokinetic coupling apparatus according to claim 4, characterised in that the free wheel includes at least one outer cage (166) which axially retains the intermediate elements, and in that the lateral flange (146, 346) is an element produced in a single piece with the outer cage (166).

9. Hydrokinetic coupling apparatus according to claim 7, characterised in that the lateral flange (146, 346) is linked in rotation to the central part of the reactor (138).

10. Hydrokinetic coupling apparatus according to claim 9, characterised in that the outer periphery of the lateral flange (146, 346) includes at least on rotational drive spigot (192, 392) which extends, especially radially outwards or axially, and which is received into a complementary recess (194, 394) of the central part of the reactor which is open axially towards the flange (146, 346).

11. Hydrokinetic coupling apparatus according to claim 7, characterized in that the lateral flange (346, 146) is linked in rotation to the outer ring (162).

12. Hydrokinetic coupling apparatus according to claim 4, characterised in that the lateral flange (146, 346) is retained axially with respect to the central part of the reactor body (138).

13. Hydrokinetic coupling apparatus according to claim 12, characterised in that the lateral flange (146, 346) is retained axially by elastically deformable hooks (200, 400) received into complementary recesses (202, 402).

14. Hydrokinetic coupling apparatus according to claim 1, characterised in that the rod-shaped element is produced in the form of an independent component (238, 300).

15. Hydrokinetic coupling apparatus according to claim 1, characterised in that the rod-shaped element (238, 300) is produced in a single piece with an outer cage (166) of the free wheel.

16. Hydrokinetic coupling apparatus according to claim 1, characterised in that the rod-shaped element is produced in a single piece with a lateral flange (146, 346).

17. Hydrokinetic coupling apparatus according to claim 1, characterised in that the flange (146, 346) includes a transverse face which constitutes a bearing track for an axial, needle-type thrust bearing interposed between the reactor and the turbine wheel, or between the reactor and the impeller wheel.

* * * * *